(12) United States Patent
Roth et al.

(10) Patent No.: US 10,880,283 B1
(45) Date of Patent: Dec. 29, 2020

(54) TECHNIQUES FOR REMOTE ACCESS TO A COMPUTING RESOURCE SERVICE PROVIDER

(71) Applicant: Amazon Technologies, Inc., Reno, NV (US)

(72) Inventors: Gregory Branchek Roth, Seattle, WA (US); Eric Jason Brandwine, Haymarket, VA (US); Christopher Brian Barclay, Seattle, WA (US); Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/317,638

(22) Filed: Jun. 27, 2014

(51) Int. Cl.
*H04L 29/06* (2006.01)
*G06F 21/31* (2013.01)

(52) U.S. Cl.
CPC .............. *H04L 63/08* (2013.01); *G06F 21/31* (2013.01); *H04L 63/083* (2013.01); *H04L 63/0815* (2013.01); *H04L 63/0823* (2013.01)

(58) Field of Classification Search
CPC ........................................................ H04L 63/08
USPC ............................................................ 726/5
See application file for complete search history.

(56) References Cited

U.S. PATENT DOCUMENTS

| | | | | |
|---|---|---|---|---|
| 6,055,637 A * | 4/2000 | Hudson | ............... | G06F 21/6218 709/225 |
| 8,544,068 B2 * | 9/2013 | Yates et al. | ........................ | 726/4 |
| 8,660,129 B1 * | 2/2014 | Brendel | .................. | H04L 67/10 370/397 |
| 2003/0093690 A1 * | 5/2003 | Kemper | .................. | G06F 21/31 726/5 |
| 2004/0073666 A1 * | 4/2004 | Foster | .................. | H04L 63/102 709/225 |
| 2004/0193921 A1 * | 9/2004 | Byrne | ..................... | G06F 21/41 726/12 |
| 2008/0046569 A1 * | 2/2008 | DePue | ............... | G06Q 30/0207 709/227 |

(Continued)

OTHER PUBLICATIONS

Chad Cotti et al., "Alcohol-impaired motor vehicle crash risk and the location of alcohol purchase," Social Science & Medicine 2014, pp. 201-209. (Year: 2014).*

(Continued)

*Primary Examiner* — Luu T Pham
*Assistant Examiner* — Canh Le
(74) *Attorney, Agent, or Firm* — Davis Wright Tremaine LLP

(57) ABSTRACT

Method and apparatus for remotely accessing a computing resource service provider are disclosed. In the method and apparatus, a first computing environment sends, to a second computing environment, a request for information usable for accessing the second computing environment. In response to the request, the information that is usable to remotely access a subset of the computing resources of the second computing environment is made available to a computing system of the first computing environment, whereby the subset of the computing resources is provisioned for a customer of the second computing environment and the customer of the second environment operates the first computing environment.

22 Claims, 8 Drawing Sheets

(56) References Cited

U.S. PATENT DOCUMENTS

| | | | | |
|---|---|---|---|---|
| 2008/0060065 A1* | 3/2008 | Wynn | ............... | H04W 12/0609 |
| | | | | 726/5 |
| 2008/0083025 A1* | 4/2008 | Meijer | ................. | H04L 9/3271 |
| | | | | 726/9 |
| 2009/0217367 A1* | 8/2009 | Norman | ............. | H04L 63/0815 |
| | | | | 726/8 |
| 2009/0300152 A1* | 12/2009 | Ferris | .................... | G06F 9/5072 |
| | | | | 709/223 |
| 2010/0251360 A1* | 9/2010 | Sinclair | .......................... | 726/19 |
| 2013/0160144 A1* | 6/2013 | Mok et al. | ...................... | 726/29 |
| 2013/0305338 A1* | 11/2013 | Casals Andreu | ... | H04L 63/0815 |
| | | | | 726/8 |
| 2014/0315571 A1* | 10/2014 | Saari | .................... | H04W 64/00 |
| | | | | 455/456.1 |
| 2015/0074362 A1* | 3/2015 | Mohl | .................... | G06F 3/0667 |
| | | | | 711/162 |
| 2015/0135257 A1* | 5/2015 | Shah | ....................... | H04L 63/08 |
| | | | | 726/1 |
| 2015/0341445 A1* | 11/2015 | Nikolov | ................. | H04L 67/16 |
| | | | | 709/203 |
| 2015/0373012 A1* | 12/2015 | Bartz | ................. | H04L 63/0823 |
| | | | | 726/7 |

OTHER PUBLICATIONS

Jaroslaw Slawinski et al., "Experiences with Target-Platform Heterogeneity in Clouds, Grids, and On-Premises Resources," 2012, pp. 41-52. (Year: 2012).*

* cited by examiner

TECHNIQUES FOR REMOTE ACCESS TO A COMPUTING RESOURCE SERVICE PROVIDER

BACKGROUND

The use of remote computing resources has proliferated in recent years. Remote computing allows users to forego the high costs associated with building a computing infrastructure. Instead, the users may utilize the computing resources of a service provider that often come at a small fraction of the cost associated with establishing their own data centers. The remote computing resources permit users to store data, host websites and, generally, service their clients' needs. Further, with remote computing, the amount of resources allocated to users may be flexibly scaled as the demand for computing functionality changes. In many instances, the remote computing resources may be used to supplement computing resources that are present on a user's on-premises infrastructure.

Accordingly, it is often challenging to configure computing devices of a user's on-premises infrastructure to access the remote computing resources allocated to the user. Further, it is also challenging to define a secure access mechanism for the on-premises computing resources.

BRIEF DESCRIPTION OF THE DRAWINGS

Various embodiments in accordance with the present disclosure will be described with reference to the drawings, in which.

DETAILED DESCRIPTION

Figure 1:
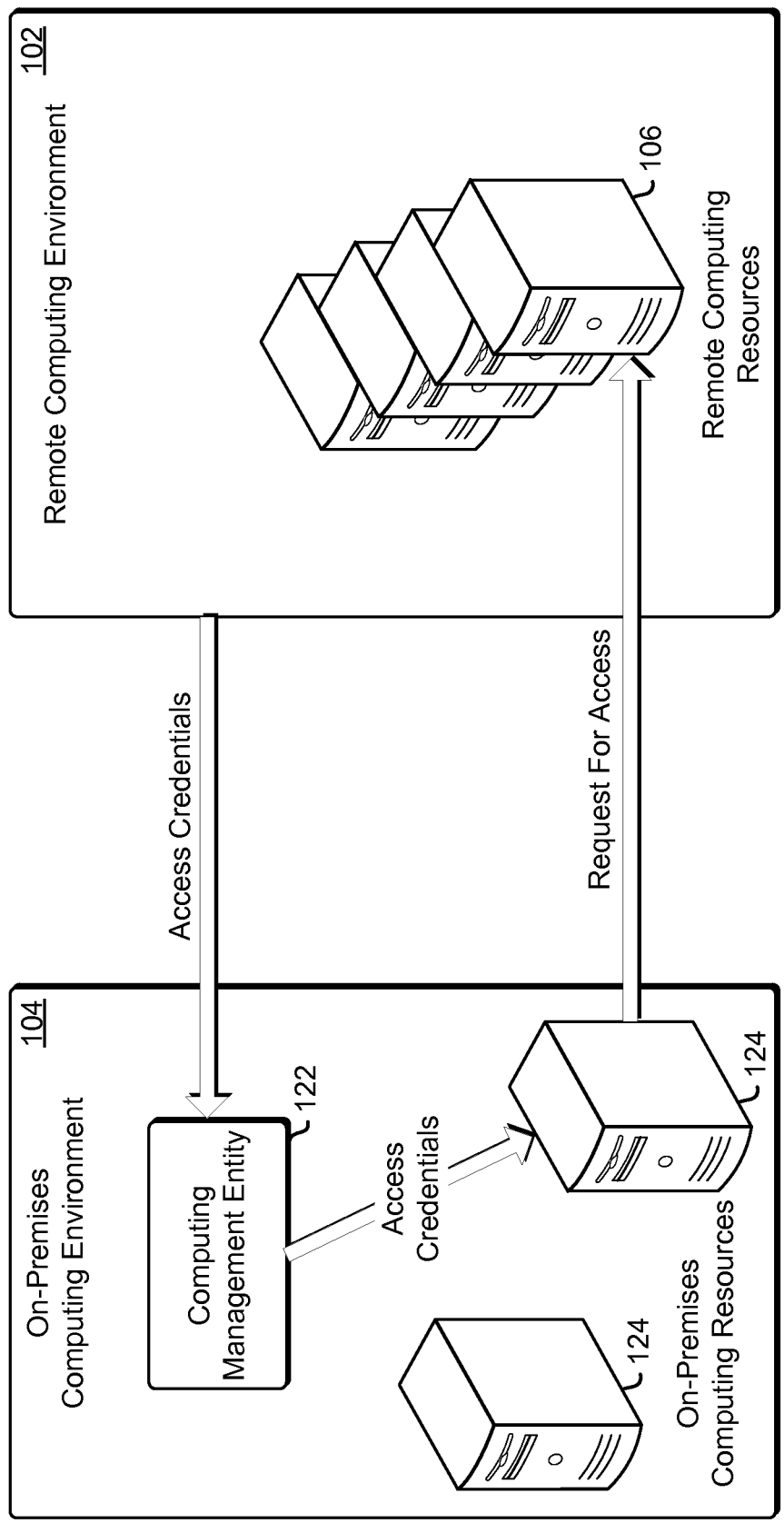
FIG. 1 shows an example of configuring access to computing resources of a remote computing environment in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include configuring on-premises computing resources of a customer for access to remote computing resources allocated to the customer. A customer of a remote computing resource service provider (also referred to herein as a remote computing environment), which may be an organization, among others, and may have an on-premises computing environment. The on-premises computing environment may be one or more computing resources, such as computers, servers, hosts, databases, storage devices or networking or communications devices, among others. The on-premises computing environment may be independent of the remote computing environment and communication between the two computing environments may be performed over a network, such as the Internet or an intranet. The customer may add computing capacity to their on-premises computing environment or may supplement their on-premises computing environment by utilizing computing functionality provided by the remote computing environment. As described herein, it is advantageous for a virtual computing system of the on-premises computing environment to securely and efficiently access a virtual computing system or a database of the customer executed on the remote computing environment.

The customer may configure a role for computing resources of the on-premises computing environment. The role may specify one or more actions that are permitted to be performed by a party assuming the role or a party having credentials for the role. Further, the role may specify a condition on an identity associated with a party assuming the role or receiving credentials associated with the role. The customer's configuration may be provided to the remote computing environment for enabling access in accordance with the specified role. Having configured the role, the on-premises computing environment may be additionally configured for assuming the role.

A computing management entity of the on-premises computing environment, whereby the computing management entity may be any type of computer, host or server, among others, may be configured to request credentials information enabling performing the one or more actions associated with role. Further, the computing management entity may be configured to make the credentials information available to computing resources within the on-premises computing environment for performing one or more actions associated with the role. The computing management entity may, for example, be a computer system program, process, application, module or operating system entity, among others, that is configured to instantiate one or more virtual computer systems on host computer systems. For example, the computing management entity may manage a "stack" of virtual machines in a computer environment. The computing management entity may be configured with an agent, which may be a plug-in, computer system program or application, among others, that facilitates communicating with the remote computing environment, identifying the computing management entity to the remote computing environment and obtaining credentials from the remote computer environment, among others.

Following obtaining the credentials information from the remote computing environment, the computing management entity may cause the credentials information to be provided to an on-premises computing system. The on-premises computing system may utilize the credentials information to access the customer's resource in the remote computing environment and perform one or more actions as permitted by the configured role. It is advantageous for the computing management entity or its associated agent (which as described herein may be part of the computing management entity) to assign the credentials information to the on-premises computing system due at least in part to the fact that the on-premises computing system is within the purview of the computing management entity, whereas the on-premises computing system may not be initially identifiable to the remote computing system. The on-premises computing system may utilize the credentials to access the customer's resources in the remote computing environment by, for example, submitting the credentials for authentication along with an identity associated with the on-premises computing system.

FIG. 1 shows an example of configuring access to computing resources of a remote computing environment in accordance with at least one embodiment. A remote computing environment 102 and an on-premises computing environment 104 are shown in FIG. 1. The remote computing environment 102 may be a data center, among others, that is configured to provide computing capability to customers of the remote computing environment 102. The on-premises computing environment 104, which may include computers, databases, servers, storage device or networking devices, among others, may belong to a customer of the remote computing environment 102. To enable efficient access to the remote computing resources 106 of the customer, a computing management entity 122 of the on-premises computing environment 104 may be provided with access credentials that are usable for obtaining access to the remote computing resources 106. The access credentials may include access keys or tokens, among other types of authentication data.

The computing management entity 122 may manage on-premises computing resources 124 (also referred to herein as on-premises computing resource 124) of the customer as described herein. The computing management entity 122 may determine an identity of an on-premises computing resource 124 that is to be granted access to the remote computing resources 106. The computing management entity 122 may cause the received access credentials to be provided to the on-premises computing resource 124. In turn the on-premises computing resource 124 may utilize the access credentials to request access to the remote computing resources of the remote computing environment 102.

Figure 2:
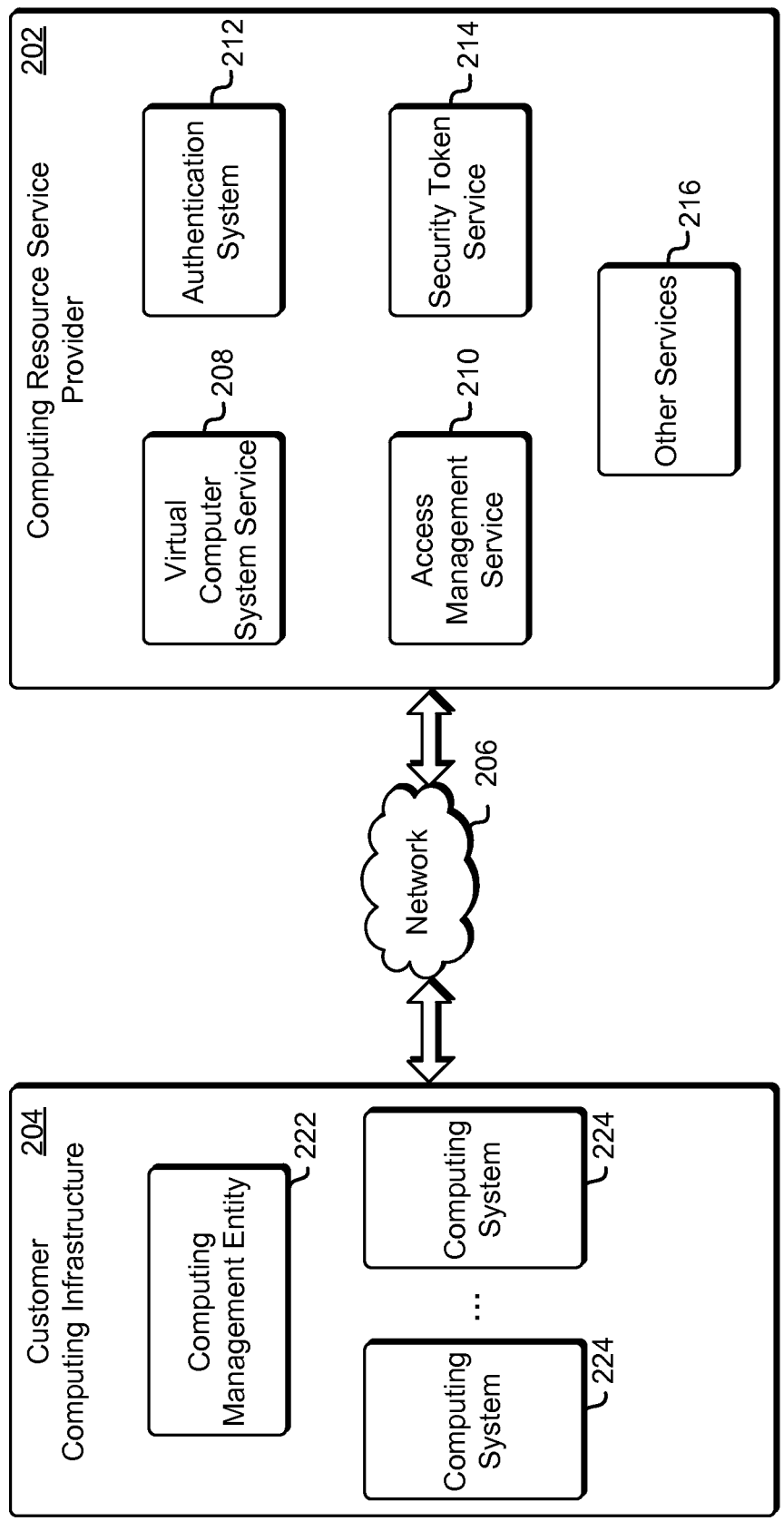
FIG. 2 shows an example of a customer computing infrastructure connected to a computing resource service provider in accordance with at least one embodiment.

FIG. 2 shows an example of a customer computing infrastructure connected to a computing resource service provider in accordance with at least one embodiment. The computing resource service provider 202 may provide a variety of services to the customer or associated customer computing infrastructure 204 and the customer computing infrastructure 204 may communicate with the computing resource service provider via an interface (not shown), which may be a web services interface or any other type of customer interface. It is noted that each service of the computing resource service provider 202 may have its own interface or subsets of the services may have corresponding interfaces.

The customer computing infrastructure 204 may pertain to an organization that may utilize one or more of the services provided by the computing resource service provider 202 to maintain and deliver information to its employees, which may be located in various geographical locations. Additionally, the customer computing infrastructure 204 may belong to individual that utilizes the services of the computing resource service provider 202 to deliver content to a working group located remotely.

As shown in FIG. 2, the customer computing infrastructure 204 may communicate with the computing resource service provider 202 through a network 206, whereby the network 206 may be a communication network, such as the Internet, an intranet or an Internet service provider (ISP) network. Some communications from the customer computing infrastructure 204 to the computing resource service provider 202 may cause the computing resource service provider 202 to operate in accordance with one or more embodiments described herein or a variation thereof or communications from the computing resource service provider 202 to the customer computing infrastructure 204 may cause the customer computing infrastructure 204 to operate in accordance with one or more embodiments described herein or a variation thereof.

The customer computing infrastructure 204 includes a computing management entity 222 and one or more computing systems 224 (singularly referred to herein as computing system 224). The computing management entity may be a host or server, among others that is responsible for managing the computing systems 224, which may be computers, servers, hosts, databases, storage devices or networking or communications devices, among others. The computing management entity 222 may be a virtual computing management entity and the computing systems may be virtual computing system, whereby the virtual computing management entity may manage the assignment of the virtual computing systems to underling host computing systems upon which the virtual computing systems are instantiated. A host computing system may be any type of computer, such as a server, that is configured for the creation of a virtual computing platform. The host computing system may be equipped with a processor, such as a central processing unit (CPU) or a graphics processing unit (GPU), that provides computing functionality as well as memory, such as static or dynamic memory. In addition, the host computing system may also be equipped with communication or network devices, such as network cards or modems, among others, that enable the host computing system to communicate in accordance with a wired or wireless communications protocol with the computing resource service provider 202 or other entities. The virtual computing systems may be instantiated using the resources provided by one or more host computing systems and the resources of the one or more host computing systems may be used to enable operation of the virtual computing systems.

The virtual computing management entity may be a computer system program, process, client, server, service, application, module, operating system entity, controlling domain, communication node or collection of these or other such computer system entities. The virtual computing management entity may manage the assignment of the resources of host computing systems to the virtual computing systems based at least in part on the computing power that is sought to be provided to a virtual computing system. For example, in a data center with a large number of host computing systems, the virtual computing management entity may unify resources provided by each host computing system for sharing or distribution for use instantiated virtual computing systems. Instantiation of virtual computing systems may be performed using a virtualization layer, such as a hypervisor. Examples of the computing management entity includes any virtual system management entity, such as vCenter™, Hyper-V™, *Eucalyptus*, and Openstack™. A plug-in may be provided to enable the computing management entity to perform one or more actions or operations as described herein.

In addition to the computing systems 224 provided by the customer computing infrastructure 204, the customer may also utilize computing resources provided by the computing resource service provider 202. For example, the customer may seek to add computing capability to that provided by their own infrastructure. Further, in the event that the customer's infrastructure is not configured to provide a particular capability (such as a database storage), the customer may seek to utilize the capabilities provided by the computing resource service provider 202. Proper usage of the capabilities provided by the computing resource service provider 202 may require that entities of the customer computing infrastructure 204 (such as the computing systems 224) be given temporary or permanent access to resources with the computing resource service provider 202 that are allocated to the customer.

The computing resource service provider 202 may provide various computing resource services to the customer computing infrastructure 204. The services provided by the computing resource service provider 202, in this example, include a virtual computer system service 208, an access management service 210, an authentication system 212, a security token service 214 and one or more other services 216. It is noted that not all embodiments described herein include the services 208-216 described with reference to FIG. 2 and services may be provided in addition to or as an alternative to services explicitly described herein. As described herein, each of the services 208-216 may include one or more web service interfaces that enable the customer computing infrastructure 204 to submit appropriately configured API calls to the various services through web service requests. In addition, each of the services 208-216 may include one or more service interfaces that enable the services 208-216 to access each other (e.g., to enable a virtual computer system of the virtual computer system service 208 to store data in or retrieve data from an on-demand data storage service (not shown) and/or to access one or more block-level data storage devices provided by a block level data storage service (not shown)).

The virtual computer system service 208 may be a collection of computing resources configured to instantiate virtual machine instances on behalf of the customer. As used herein, unless otherwise stated or clear from context, the term "service" may be understood to be a computer system program, process, client, server, service, application, module, operating system entity, controlling domain, communication node or collection of these and/or other such computer system entities. A "service" may be a client and/or a server and in some embodiments may be configured to send and/or receive communications, data, requests and/or other such requests from other services within the computer system.

The customer computing infrastructure 204 may interact with the virtual computer system service 208 (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 208 is shown in FIG. 2, any other computer system or computer system service may be utilized in the computing resource service provider 202, such as a computer system or computer system service that does not employ virtualization or instantiation and instead provisions computing resources on dedicated or shared computers/servers and/or other physical devices.

The computing resource service provider 202 includes an access management service 210. The access management service 210 may be a collection of computing resources or other resources collectively configured to enable securing access to computing resources or other resources computing of the customer (or their associated customer computing infrastructure 204) that are provided by the computing resource service provider 202. As used herein, unless otherwise stated or clear from context, the term "service" may be understood to be a computer system program, process, client, server, service, application, module, operating system entity, controlling domain, communication node or collection of these and/or other such computer system entities. A "service" may be a client and/or a server and in some embodiments may be configured to send and/or receive communications, data, requests and/or other such requests from other services within the computer system.

The access management service 210 enables customers to create users and assign individual security credentials (such as access keys, passwords, and multi-factor authentication devices) to the users. Further, the customer may request temporary security credentials for users or for entities of the customer computing infrastructure 204 and may manage permissions to specify the type or number of operations that may be performed. The access management service 210 further enables creating and managing roles that are given to users or entities of the customer computing infrastructure 204 and their associated permissions. Further, permissions may be specified to control the identities of an entity or service that are permitted to assume a role as well as the operations that may be performed by the entity or the service assuming the role.

The access management service 210 may enable establishing federated users and specifying the permissions associated with a federated user. Federated users may be users that are associated with an enterprise, whereby the enterprise lends the users the federated identity. Accordingly, identity federation may be used to permit existing users in an enterprise to perform function calls (such as application programming interface (API) function calls) and to access resources without the need for creating an independent account for each identity. To ensure that vended access credentials do not compromise system security, the access credentials may be rotated or required to be renewed periodically.

Furthermore, the access management service 210 may enable associating a user identity with the customer's computing management entity 222. The computing management entity 222 may utilize the identity to request assuming a role, whereby the role may grant the computing management entity 222 or an associated computing system 224 a set of permissions for performing one or more actions on one or more systems or services of the computing resource service provider 202. For example, the actions may include accessing a computing system of the virtual computer system service 208 or reading or writing data to a storage service (not shown) of the computing resource service provider 202.

As illustrated in FIG. 2, the computing resource service provider 202, in various embodiments, includes an authentication system 212. The authentication system 211, in an embodiment, is a computer system (i.e., collection of computing resources) configured to perform operations involved in authentication of users of the customer. For instance, one of the services 208, 210, 214, 216 may provide information from a user to the authentication system 212 and may, in turn, receive information that indicates whether or not one or more requests associated with the user are authentic.

The computing resource service provider 202 further includes a security token service 214. The security token service 214 may be a collection of computing resources or other resources collectively configured to enable granting a trusted entity temporary or limited access to resources provided the computing resource service provider 202. As used herein, unless otherwise stated or clear from context, the term "service" may be understood to be a computer system program, process, client, server, service, application, module, operating system entity, controlling domain, communication node or collection of these and/or other such computer system entities. A "service" may be a client and/or a server and in some embodiments may be configured to send and/or receive communications, data, requests and/or other such requests from other services within the computer system.

The security token service 214 may receive a request to assume a role from the computing management entity 222. The security token service 214 may perform one or more actions to confirm that the computing management entity 222 is permitted to assume the role (for example, based at least in part on a policy). The security token service 214 may further cause credentials to be provided the computing management entity 222, whereby the credentials may include an access key, a security key, a token or an expiration time associated with the credentials. The credentials may be usable by the computing management entity 222 (or computing system 224) to access the computing resource service provider 202 or associated entities to perform permitted actions. As described herein, the authentication system 212 may be responsible for authenticating a request for access by an entity of the customer computing infrastructure 204.

The computing resource service provider 202 additionally maintains one or more other services 216 based at least in part on the needs of its customers or associated customer computing infrastructure 204. For instance, the computing resource service provider 202 may maintain a database service. A database service may be a collection of computing resources that collectively operate to run one or more databases for one or more customers. The customer computing infrastructure 204 may be configured with credentials to operate and manage the database from the database service by utilizing appropriately configured API calls. This, in turn, may allow a customer to maintain and potentially scale the operations in the database. Other services include, but are not limited to, object-level archival data storage services, services that manage or monitor other services of the computing resource service provider 202 or the customer computing infrastructure 204.

Figure 3:
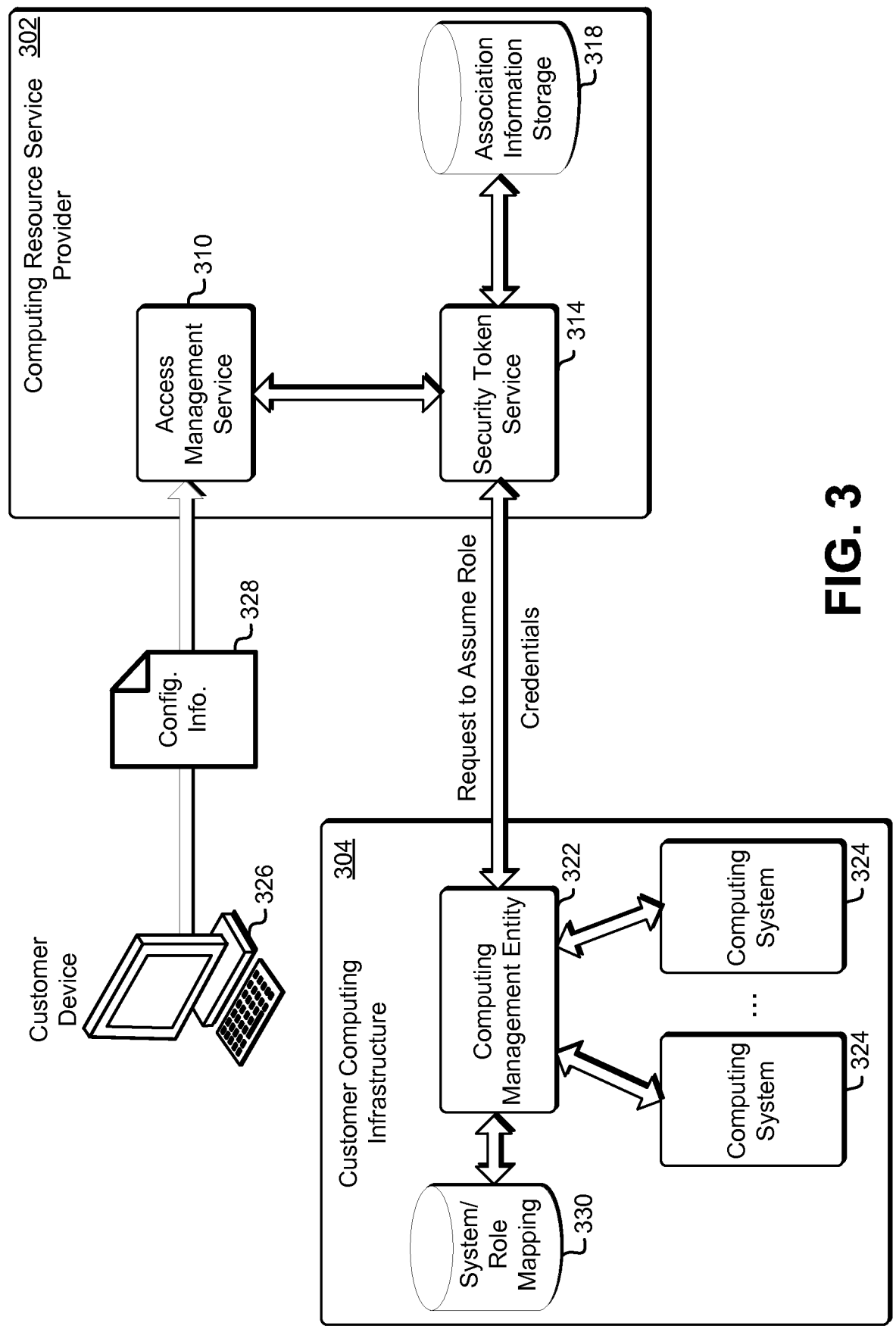
FIG. 3 shows an example of an environment for configuring access to a computing resource service provider by a customer computing infrastructure in accordance with at least one embodiment.

FIG. 3 shows an example of an environment for configuring access to a computing resource service provider by a customer computing infrastructure in accordance with at least one embodiment. A customer device 326 provides configuration information 328 to an access management service 310 of the computing resource service provider 302. The customer device 326 may be any type of computer that is capable of communicating with the computing resource service provider 302. For example, the customer device 326 may be a computer or a server, among others. Further the customer device 326 may be belong with an administrator associated with a customer, whereby the customer device 326 may be used to configure access to the computing resources of the customer that are provided by the computing resource service provider 302. Although the customer device 326 is shown in FIG. 3 as being separate from the customer computing infrastructure 304, it may be contemplated that the customer device 326 and the customer computing infrastructure 304 are part of the same entity. The configuration information 328 may specify that the computing management entity 322 of the customer computing infrastructure 304 is to be designated or assigned as a user associated with the customer's account. The designation or assignment may give the computing management entity 322 privileges to access computing resources associated with the customer, whereby the computing management entity 322 may, for example, configure the computing systems 324 with access to the customer's resource.

The configuration information 328 may further specify a set of roles, whereby each role of the set of roles may be associated with a role identifier and one or more designated permissions. The roles may be specified as a way to provide access to the computing resources of the customer. The permissions of the role may specify one or more actions that a party assuming the role may take with respect to the customer's resources. For example, a permission may specify that a party assuming the role is permitted to launch or terminate an instantiated virtual computing system of the customer in the virtual computer system service 208 described with reference to FIG. 2, cause the instance to perform one or more operations or receive the results of performed operations. Further, the party may be permitted to read or write data to a database or storage service, among many other actions. The configuration information 328 may also specify one or more conditions on assuming the role, whereby the conditions may specify an identity of a party who may assume the role or conditions under which conditions the role may be assumed, among others. For example, the configuration information 328 may specify that one or more roles of the set of rules may be assumed by the computing management entity 322.

Upon designating the computing management entity 322 as a user associated with the customer's account and setting one or more roles that may be assumed by the computing management entity 322, the computing management entity 322 may make a request to assume a role to the security token service 314. The request may be an application programming interface function call to the security token service 314. In response to the request, the security token service 314 may verify that the computing management entity 322 is designated (or trusted) to assume the role. Further, the security token service 314 may provide, to the computing management entity 322, credentials that are usable to obtain access to the computing resource service provider 302 to perform one or more actions permitted by the specified role. The credentials may include an access key identity, a secret key, a token and an indication of an expiration of the credentials (such as a time of expiration), among others.

Further, the security token service 314 may record or register, in the association information storage 318, an association between an identity of the computing management entity 322 and the role for which a request for credentials or role assumption was received. The association information storage 318 may be any type of storage service or a database, such as a SQL database or a NoSQL database. The association may be retained for auditing vended credentials or assumed roles. Further, the association may be usable for updating expired credentials, for example, using a process of credentials rotation that causes credentials to be expired and new or replacement credentials to be provided.

The computing management entity 322 may be configured to identify the computing systems 324 that are part of the customer computing infrastructure 304. The computing management entity 322 may further be configured to provide or make available to a computing system 324 the requisite credentials for the computing system 324 to access the resources of the customer provided by the computing resource service provider 302. The provided credentials permit the computing system 324 access to the resources as specified in a role set forth by the customer device 326. The credentials enable cooperation between the computing systems 324 of the customer computing infrastructure 304 and any computing resources of the customer that are provided by the computing resource service provider 302. Accordingly, resources in the two computing environments (or infrastructures) may be used together or in a concerted manner to accomplish the computing needs of the customer. Further, a trust barrier that may be implemented by the computing resource service provider 302 to secure the resources under its control may be bridged. The credentials may be generated by the computing resource service provider 302 or the computing management entity 322. For example, the computing management entity 322 may generate the credentials and make them available to the computing systems 324. Further, the computing management entity 322 may indicate to the computing resource service provider 302 that the generated credentials were provided for use or that access to computing resources is to be granted to an entity submitting the credentials for authentication.

Figure 4:
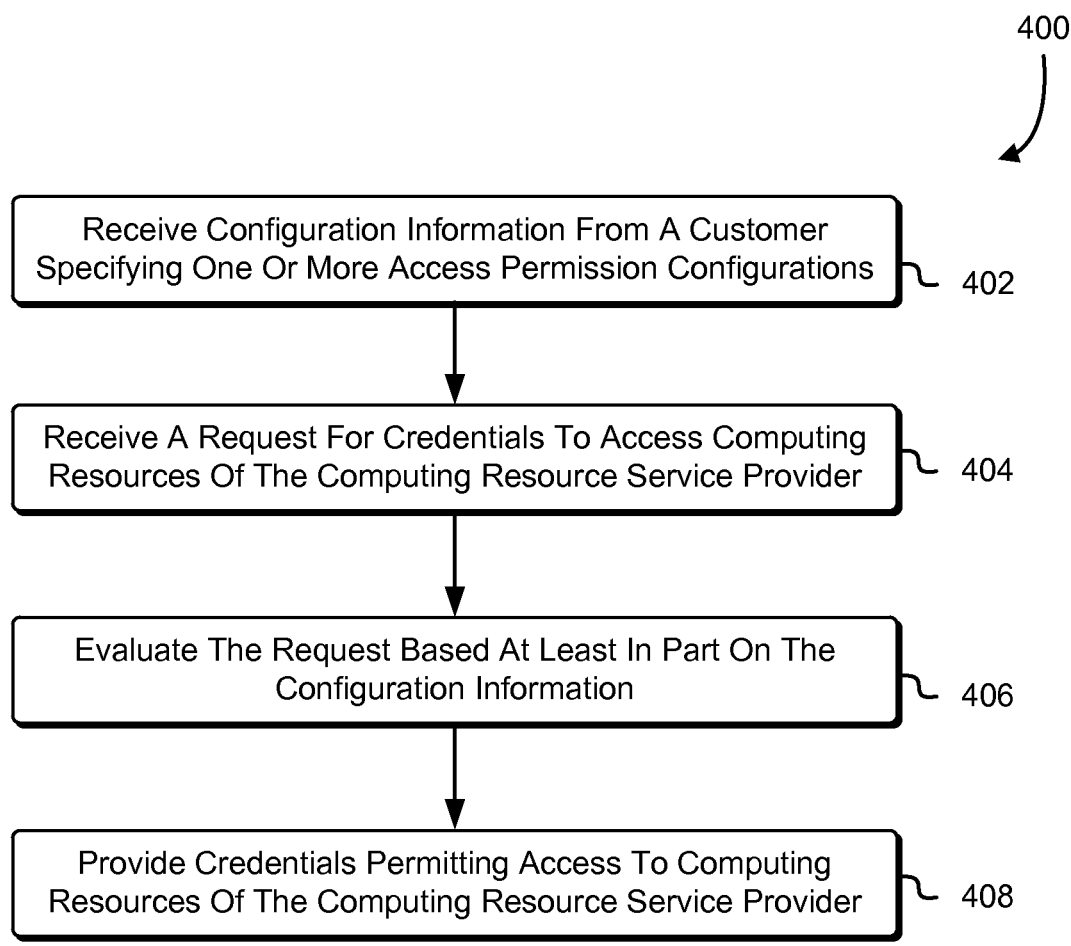
FIG. 4 shows an example of a method for providing credentials for access to computing resources of a computing resource service provider in accordance with at least on embodiment.

FIG. 4 shows an example of a method for providing credentials for access to computing resources of a computing resource service provider in accordance with at least on embodiment. In the process 400, a computing resource service provider, such as the computing resource service provider described with reference to numeral 202 in FIG. 2, receives 402 configuration information from a customer specifying one or more access permission configurations. As described herein, the configuration information may specify a set of roles and an access permission configuration for each role of the set of roles. Further, the configuration information may specify an identity associated with a trust provider which may be provided with credentials for performing one or more permitted actions.

The computing resource service provider then receives 404 a request for credentials to access computing resources of the computing resource service provider. The request may be an application programming interface function call that is received from an on-premises computing management entity, such as the computing management entity 222 described with reference to FIG. 2. Prior to making the computing management entity may be configured with an identity that is associated with the customer's account with the computing resource service provider. The identity with which the computing management entity is associated may enable the computing management entity to submit the request or other types of requests to the computing resource service provider. The computing resource service provider or an entity thereof, such as the security token service 314 described with reference to FIG. 3, evaluates 406 the request based at least in part on the configuration information. For example, the security token service may verify that the received configuration information indicates that the entity submitting the request is permitted to assume a requested role and, may, accordingly receive the requested credentials. The computing resource service provider provides 408 the credentials permitting access to computing resources of the computing resource service provider to the requesting computing management entity. The credentials, which may be short-term or limited-term, may then be made available to on-premises computing resources of the customer.

The credentials may be made available to an on-premises virtual computing system, whereby the computing management entity may be a server or computer system that manages a "stack" of virtual computing systems. A virtual device, such a virtual block device or hard drive, used to store the credentials may be attached to the virtual computing system and may be used by the virtual computing system to access the credentials. Examples of the virtual device may include a universal serial bus (USB) device, a Peripheral Component Interconnect (PIC) Express device or any attachment layer device. Further, a shared memory region or a location in block memory accessible to the computing system may be used to store the credentials. In an embodiment, the computing management entity or another entity may detect or intercept an action by the computing system, such a read from the computing resource service provider, and may provide the credentials (for example, in real time) in response to the detection. In another embodiment, a device storing the credential may be updated with new credentials and attached to the virtual computer system.

Further, a hypercall interface may be used to provide the credentials to the virtual computing system. Further, a hypervisor may monitor the execution of the virtual computing system and upon detection of a sequence of instructions corresponding to an authentication request, the credentials may be used to sign the request or as a mechanism for securing authentication of the request. For example, requests that are made from a network adapter of a virtual computing system may be caused to become signed. Further, a proxy server may receive requests made by the virtual computing system and cause the requests to be signed.

Figure 5:
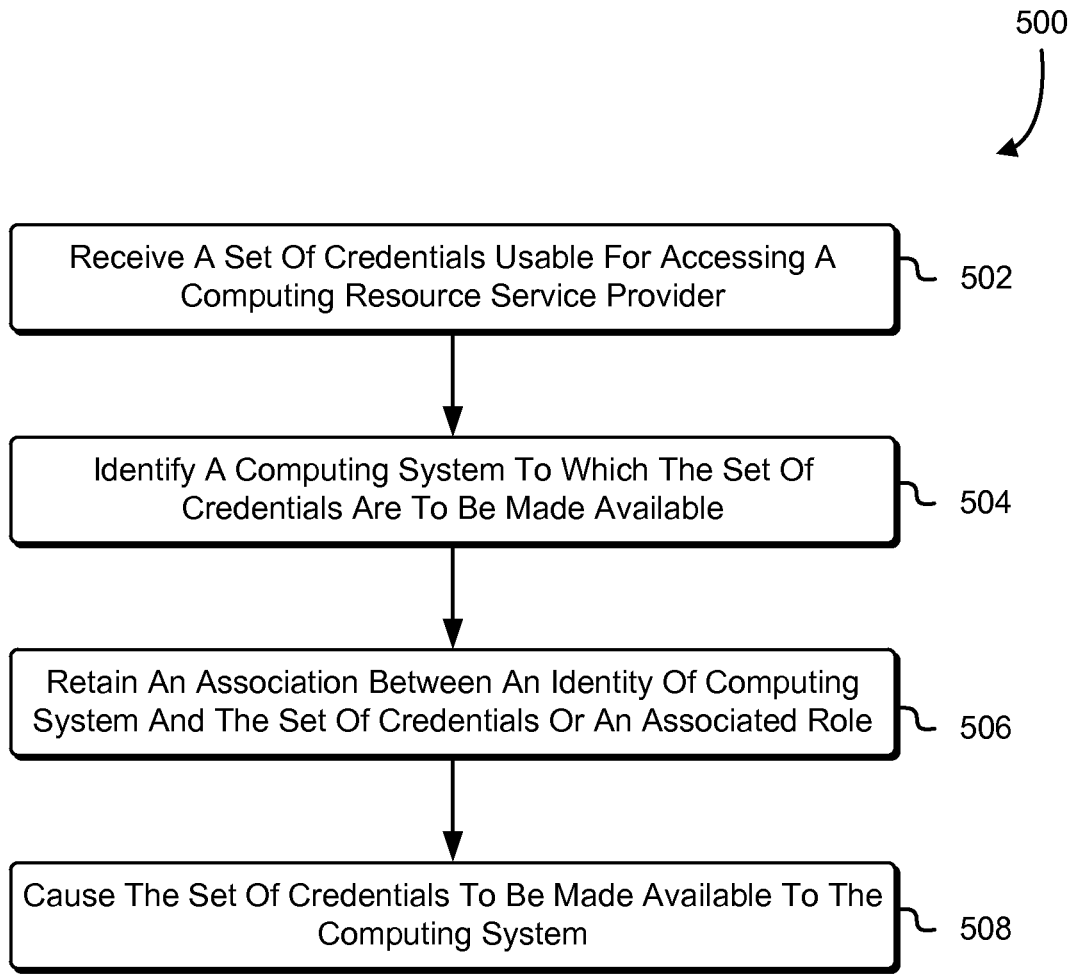
FIG. 5 shows an example of a method for credential assignment in customer computing infrastructure in accordance with at least one embodiment.

FIG. 5 shows an example of a method for credential assignment in customer computing infrastructure in accordance with at least one embodiment. In the process 500, a customer computing infrastructure or an associated entity, such as the computing management entity described with reference to numeral 222 in FIG. 2, receives 502 a set of credentials usable for accessing a computing resource service provider. It is noted that the computing management entity may be configured with a plug-in that enables receiving the credentials. The computing management entity then identifies 504 a computing system to which the set of credentials are to be made available. The computing management entity may manage a plurality of computing systems including the identified computing system. Further, the computing management entity may be configured to identify that the computing system is to be provided with the set of credentials for performing specified actions permitted by a role.

The computing management entity retains 506 an association between the identity of the computing system and the set of credentials or an associated role. The association may be retained in a storage system or a database 330 and may be used for auditing the vending of credentials as well as for updating credentials upon expiration. The computing management entity then causes 508 the set of credentials to be made available to the computing system as described herein. Causing the set of credentials to be made available to the computing system may include providing the set of credentials to a server (such as a web server), whereby the server may provide the set of credentials to the computing system upon request. For example, the set of credentials may be placed in a file system path corresponding to the computing system and only accessible by the computing system. If the computing system is a virtual computing system, virtualization management interconnects as enabled by the computing management entity may be used to provide the set of credentials.

In an embodiment, an identity may be provisioned to the computing system by the computing management entity. The identity may facilitate identifying the computing system to the computing resource service provider or its associated computing resources, such as virtual computing systems. The provisioned identity may be in the form of an identity document. The identity document may be encoded or encrypted and provided to the computing system. The identity document may include one or more attributes associated with the computing system, such as a host name, a virtual computing system identity, a medium access control (MAC) address, information specifying a hierarchy of the computing system, an identity of the computing management entity managing the computing system, the identity of networks with which the computing system is connected, the identity of software run or executed on the computing system, the identity of a pool of capacity with which the computing system is associated or a physical location of the computing system or underlying host, among others. Any identity information may be provided in the form of an identity document or as additional attributes when a role is assumed by the computing system or when the set of credential are made available to the computing system. The identifiers of a computing system may be part of a namespace that is designated to the computing management entity that manages the computing system. Accordingly, various computing systems (for example, corresponding to different virtualization products or technologies) may be associated with different computing management entities and their identities may be namespaced in accordance with their computing management entity.

In one embodiment, the set of credentials provided the computing system may be unusable by another computing system. One or more operations, such as encoding or encrypting, may be performed on the provided credentials that render the credentials unusable by a party other than the intended recipient. Further, if the set of credentials are provided to a web server to be retrieved by computing system, the web server may verify the identity of the computing system before granting the computing permission to receive the set of credentials.

In an embodiment, upon making a request to receive a set of credentials associated with a role, the computing management entity may be configured to specify one or more attributes of the computing system to which it seeks to provide the set of credentials. The security token service may evaluate the one or more attributes to determine whether the role as configured may be assumed by the computing system having the indicated attributes. The security token service may not provide the credentials if it determines that the role may not be assumed by the computing system. For example, the role may be configured such that the role may only be assumed by computing systems that meets a certain criterion of have a specified set of attributes.

Figure 6:
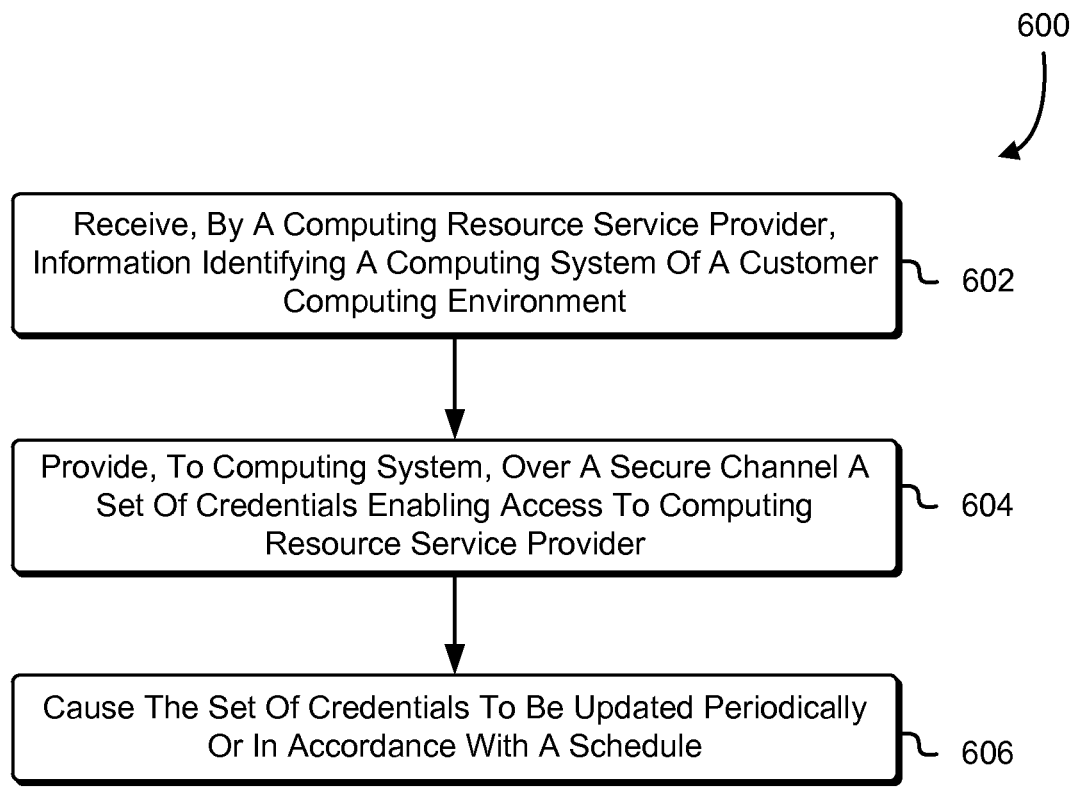
FIG. 6 shows an example of a method for providing credentials to a computing system of a customer's computing environment in accordance with at least one embodiment.

FIG. 6 shows an example of a method for providing credentials to a computing system of a customer's computing environment in accordance with at least one embodiment. In the process 600, a computing resource service provider receives 602 information identifying a computing system of a customer's computing environment. The information may be any identifying information as described herein and may include an Internet protocol (IP) address of the computing system or a secure shell (SSH) associated with the computing system. The information may be received from a computing management entity or an agent thereof (for example, plug-in), whereby the agent may be provided by the computing resource service provider for the purposes of facilitating access to the computing resource service provider by computing system managed by the computing management entity.

The computing resource service provider provides 604, to computing system, over a secure channel a set of credentials enabling access to computing resource service provider, whereby a secure shell channel over a public network may be used to provide the set of credentials. As described herein, the set of credentials may be limited-term and may expire after a period of time commencing from their creation or distribution elapses. The computing resource service provider then causes 606 the set of credentials to be updated periodically or in accordance with a schedule. For example, before or after the expiration of the set of credentials retained by the computing system, the computing resource service provider causes the updated set of credentials to be provided to the computing system.

Figure 7:
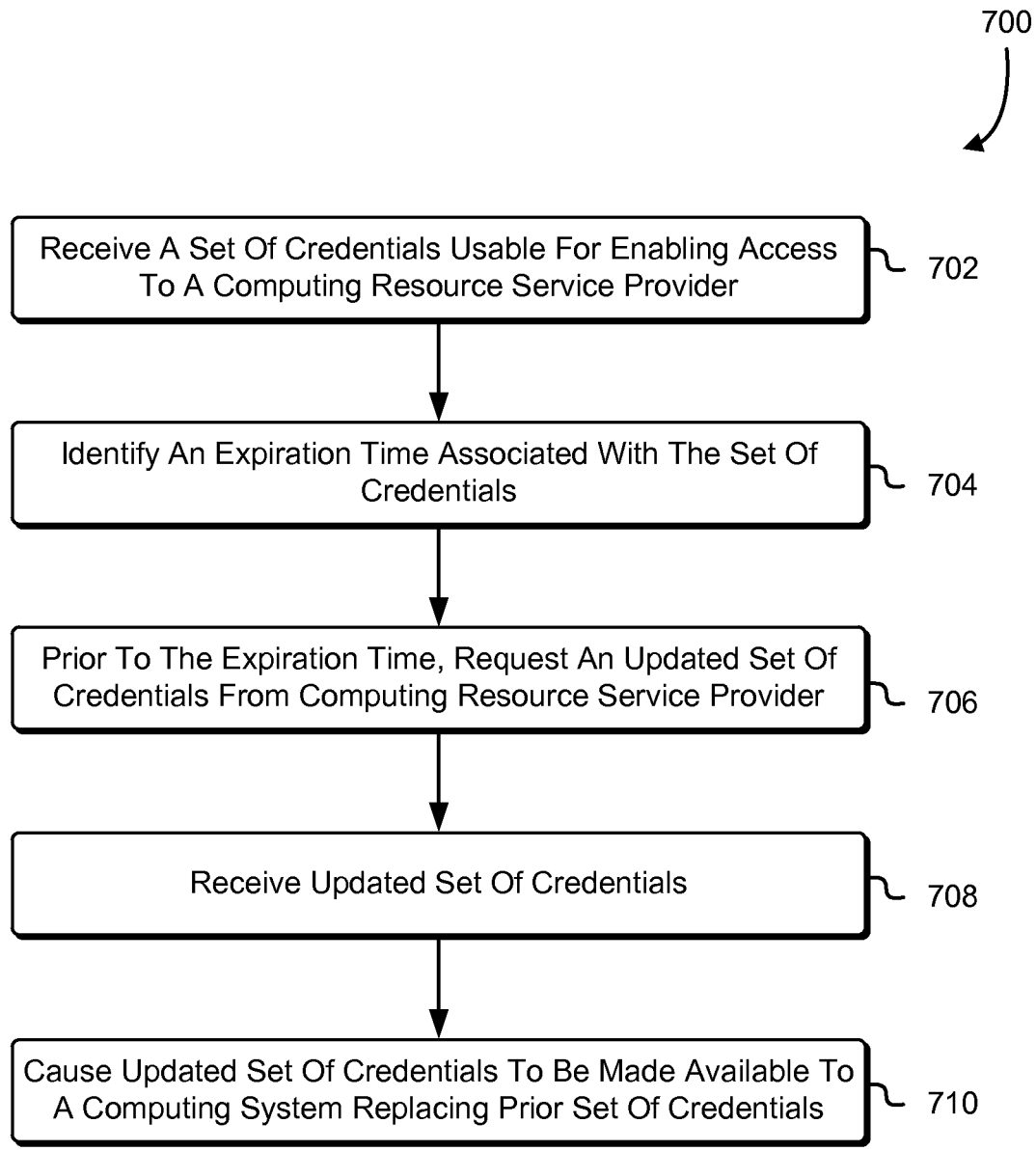
FIG. 7 shows an example of a method for updating credentials of a computing system in accordance with at least one embodiment.

FIG. 7 shows an example of a method for updating credentials of a computing system in accordance with at least one embodiment. In the process 700, a computing management entity or an agent thereof receives 702 a set of credentials usable for enabling access to a computing resource service provider. The set of credentials may have an associated expiration time following which the set of credentials may no longer be usable to obtain access to resources of the computing resource service provider or to perform one or more actions associated with a configured role. The computing management entity may cause the set of credentials to be provided to a computing system under its management. The computing management entity then identifies 704 an expiration time associated with the set of credentials.

The computing management entity requests 706 an updated set of credentials from the computing resource service provider prior to the expiration time of the received credentials. In response to the request, the computing management entity receives 708 the updated set of credentials and causes 710 the updated set of credentials to be made available to the computing system replacing prior set of credentials. Accordingly, credentials rotation enables the computing system may be configured to continually access the computing service resource provider.

The credentials generated by the computing service resource provider may be generational, whereby each set of credentials may be associated with a generation number or identifier and may be rendered obsolete or unusable when succeeded by a subsequent generation. Alternatively, a time reference, such as an Epoch time, may be associated with each set of credentials and be used to determine whether the set of credentials are expired or subject to being caused to be expired. The time reference may be measured and advanced by the computing service resource provider. It is advantageous for the computing service resource provider to be responsible for advancing the time reference. For example, if the computing service resource provider or an associated entity experiences a failure or an outage, the time reference may not be advanced in order to prolong the usability of existing credentials. Upon resuming operation, the time reference may be advanced and updated sets of credentials may be provided for use.

In an embodiment, the set of credentials usable by the computing system may be sealed to a trusted platform module (TPM) that is connected to the computing system. Accordingly, the set of credentials may only be decryptable by the computing system (for example, using code in an authorized state). Further, multifactor authorization may be used to secure delivery of the set of credentials to the computing system. For example, a key may be retained by a trusted database and the computing system may be provided with a corresponding key that is used to confirm the identity of the computing system. Further, a virtual smartcard or a peripheral component interconnect device at the virtualization layer may be used to enable making use of the credentials.

In an embodiment, the customer computing infrastructure or associated computing system may be part of an identifiable network, such as a virtual private cloud (VPC). Accordingly, requests for access to the computing resource service provider may be expected to originate from the network. As an added level of security, the computing resource service provider may be configured to determine whether an entity requesting access pertains to the identifiable network, and if the entity does not pertain to the identifiable network, the request may be denied. Further, the set of credentials may be deemed to have been misappropriated and may be caused to become expired.

Figure 8:
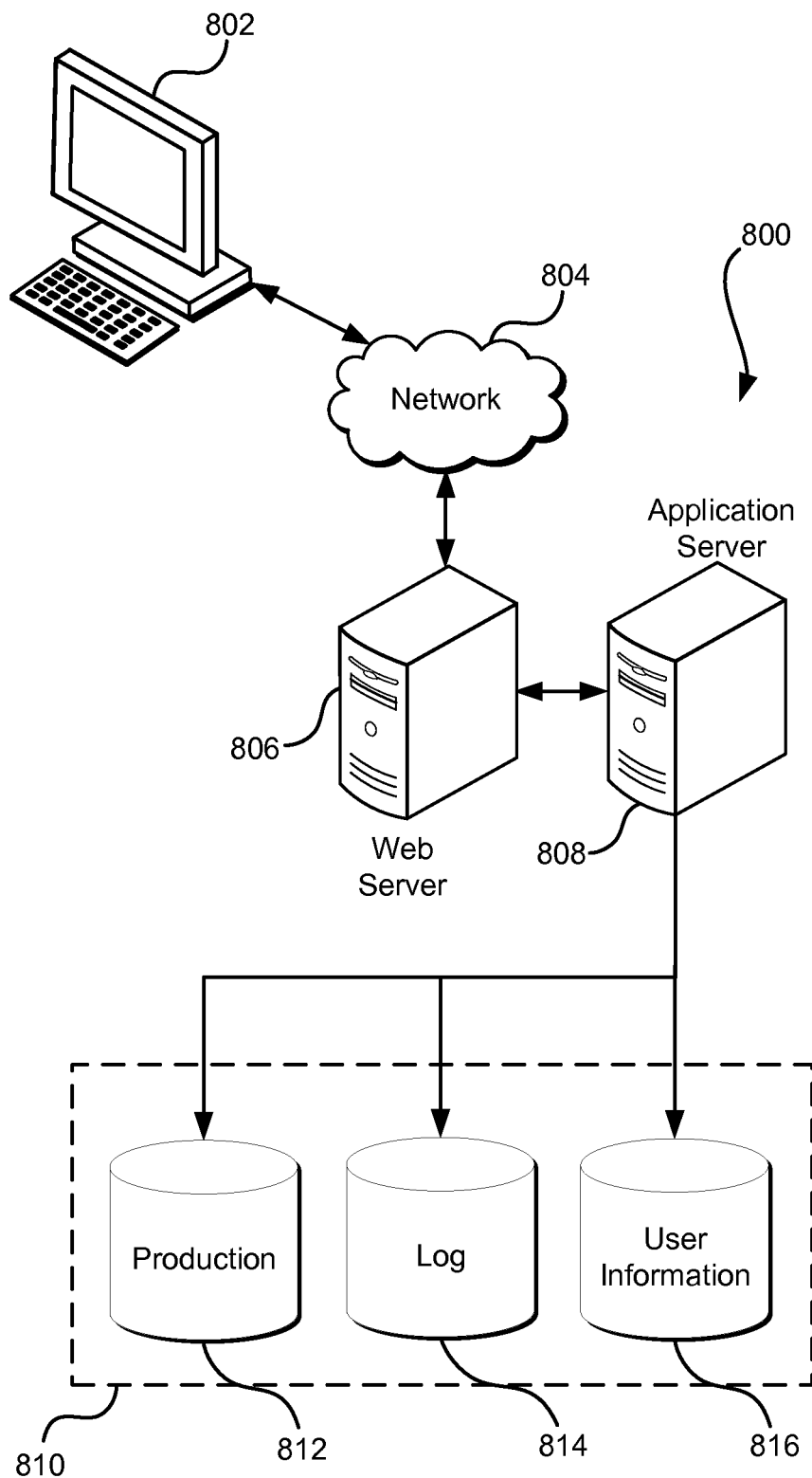
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
associating a set of permissions with a set of virtual computing systems in an on-premises computing environment located in a data center operated by a customer of a remote computing resource service provider, the set of permissions applicable to an on-premises computing management entity of the on-premises computing environment that enforces the set of permissions and the on-premises computing management entity being operable to manage the set of virtual computing systems; and based at least in part on an authentication operation performed by the on-premises computing management entity, obtaining a set of temporary credentials by at least:
  obtaining, from a virtual computing system of the set of virtual computing systems, a request to access one or more computing resources of the customer provided by the remote computing resource service provider;
  requesting the set of temporary credentials from a service of the remote computing resource service provider;
  obtaining the set of temporary credentials, the set of temporary credentials:
    registered with the remote computing resource service provider in association with the on-premises computing management entity; and
    operable to digitally sign requests to access, in accordance with the set of permissions, the one or more computing resources;
  granting the on-premises computing management entity permission to access the one or more computing resources; and
  as a result of the set of virtual computing systems being associated with the set of permissions, providing the set of temporary credentials to the set of virtual computing systems to cause the set of virtual computing systems to digitally sign, using the set of temporary credentials, the requests to access the one or more computing resources of the customer, the set of temporary credentials made available to the set of virtual computing systems by attaching a virtual device that stores the set of temporary credentials to the set of virtual computing systems.

2. The computer-implemented method of claim 1, wherein making the set of temporary credentials available to the set of virtual computing systems further includes attaching, to at least one virtual computing system of the set of virtual computing systems, a virtual device that stores a temporary credential of the set of temporary credentials, the virtual device being readable by the virtual computing system.

3. The computer-implemented method of claim 1, wherein:
  the set of temporary credentials is associated with an expiration time beyond which the set of temporary credentials is not usable for obtaining access to the one or more computing resources; and
  the method further comprises:
  identifying the expiration time of the set of temporary credentials;
  requesting a renewed set of credentials prior to the expiration time; and
  making the renewed set of credentials available to the set of virtual computing systems.

4. The computer-implemented method of claim 1, wherein obtaining the set of temporary credentials further includes:
  requesting the set of temporary credentials from the remote computing resource service provider; and
  receiving the set of temporary credentials in response to requesting the set of temporary credentials.

5. The computer-implemented method of claim 1, wherein
  granting the computing management entity permission to access the one or more computing resources is performed by designating the on-premises computing management entity as a user associated with an account of the customer.

6. The computer-implemented method of claim 1, wherein the set of temporary credentials is obtained from the on-premises computing management entity; and
  providing the set of temporary credentials to the set of virtual computing systems includes distributing, by the computing management entity, the set of temporary credentials to the set of virtual computing systems.

7. A system, comprising:
  one or more processors; and
  memory including instructions that, as a result of being executed by the one or more processors, cause the system to provide a service that:
  implements a computing resource management application for managing one or more computing systems hosted in a local computing environment operated by a customer of a remote entity; and
  as part of managing the local computing resources, the service at least:
    associates a set of permissions associated with the one or more computing systems of the local computing environment;
    obtains, from a computing system of the one or more computing systems, a request to access remote computing resources hosted in a remote computing environment by the remote entity, the remote computing environment being different from the local computing environment;
    requests a set of credentials from a service of the remote entity;
    obtains the set of credentials, the set of credentials being:
    in accordance with the set of permissions;
    available to the one or more computing systems to digitally sign requests to access the remote computing resources hosted in the remote computing environment;
    associated with at least the computing resource management application;
    registered with the remote entity; and
    stored on a virtual device that is attachable to the computing system;
    grants, to the computing resource management application, access to the remote computing resources; and
    provides the set of credentials to the computing system as a result of authenticating the computing system to cause the computing system to digitally sign, using the set of credentials, the requests to access the remote computing resources.

8. The system of claim 7, wherein:
  the computing system is a virtual computing system; and
  providing the set of credentials to the computing system of the local computing environment further includes attaching a virtual device that stores the set of credentials to the computing system, the virtual device being readable by the computing system.

9. The system of claim 7, wherein the set of credentials includes at least one of a cryptographic key, a token or an expiration time associated with the set of credentials.

10. The system of claim 7, wherein the service providing the set of credentials to the computing system comprises:
  sending a request for the set of credentials to a first service executed within the remote computing environment; and obtaining the set of credentials from a second service executed within the remote computing environment in response to the request.

11. The system of claim 7, wherein defining the set of permissions associated with the one or more computing systems includes associating a previous set of permissions with the one or more computing systems.

12. The system of claim 7, wherein defining the set of permissions, obtaining the set of credentials and providing the set of credentials to the computing system of the one or more computing systems are part of a plug-in of the computing resource management application.

13. The system of claim 7, wherein providing the set of credentials to the computing system includes providing the set of credentials to a web server accessible by the computing system.

14. The system of claim 13, wherein the web server is configured to:
   obtain a request for the set of credentials from the computing system;
   wherein authenticating the computing system further comprises authenticating an identity associated with the computing system; and
   provide the computing system the credentials based at least in part on the authenticating.

15. A non-transitory computer-readable storage medium storing thereon executable instructions that, as a result of being executed by one or more processors of a computer system, cause the computer system to:
   define a set of permissions associated with one or more computing systems in an on-premises computing environment operated by a customer of a computing resource service provider;
   obtain credential information that causes the one or more computing systems to digitally sign requests to access computing resources provided by the computing resource service provider and located within a remote computing environment, the remote computing environment being operated by the computing resource service provider and being distinct from the on-premises computing environment, the credential information obtained by causing the computer system to:
   obtain, from a virtual computing system of the one or more computing systems, a request to access the computing resources;
   request the credential information from a service of the computing resource service provider; and
   obtain the credential information, the credential information registered with the computing resource service provider and associated with the computer system;
   grant, to an entity that enforces the set of permissions, access to the computing resources; and
   provide the credential information to the virtual computing system via attaching a virtual device that stores the credential information to the virtual computing system, and in accordance with the set of permissions, to cause the virtual computing system to use the credential information to digitally sign the requests to access the computing resources.

16. The non-transitory computer-readable storage medium of claim 15, wherein the executable instructions that cause the computer system to obtain the credential information further include instructions that cause the computer system to:
   request the credential information from a first service operated within the remote computing environment; and
   obtain the credential information from a second service operated within the remote computing environment in response to the request.

17. The non-transitory computer-readable storage medium of claim 15, wherein the computing resources of the remote computing environment are allocated to the customer.

18. The non-transitory computer-readable storage medium of claim 15, wherein:
   the virtual computing system is instantiated on a host computing system; and
   providing the credential information to the computing system further includes attaching a virtual device that stores the credential information to the host computing system, the virtual device being readable by the virtual computing system.

19. The non-transitory computer-readable storage medium of claim 15, wherein the executable instructions that cause the computer system to provide the credential information to the virtual computing system further include instructions that cause the computer system to encrypt the credential information for decryption by the virtual computing system of the one or more computing systems.

20. The non-transitory computer-readable storage medium of claim 15, wherein:
   the executable instructions that cause the computer system to obtain the credential information further include instructions that cause the computer system to make a request for the credential information to the remote computing environment based at least in part on an identity of the virtual computing system; and
   the identity of the virtual computing system causes the remote computing environment to authenticate the request.

21. The non-transitory computer-readable storage medium of claim 15, wherein the credential information includes an access key, a security key, a token, or an expiration time associated with the credential information.

22. The non-transitory computer-readable storage medium of claim 15, wherein the executable instructions further comprise instructions that, as a result of being executed by the one or more processors, cause the computer system to obtain updated credential information due at least in part to expiration of the credential information.

* * * * *